US 6,351,804 B1

(12) United States Patent
Pflum

(10) Patent No.: US 6,351,804 B1
(45) Date of Patent: Feb. 26, 2002

(54) CONTROL BIT VECTOR STORAGE FOR A MICROPROCESSOR

(75) Inventor: Marty L. Pflum, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/685,987

(22) Filed: Oct. 10, 2000

Related U.S. Application Data

(63) Continuation of application No. 09/111,572, filed on Jul. 8, 1998, now Pat. No. 6,157,994, which is a continuation of application No. 08/612,536, filed on Mar. 8, 1996, now Pat. No. 5,790,821.

(51) Int. Cl.[7] ............................. G06F 9/30; G06F 9/305; G06F 9/22
(52) U.S. Cl. ..................... 712/217; 712/245; 712/228; 712/23; 712/213
(58) Field of Search ........................... 712/23, 228, 217, 712/202, 219, 218, 24, 9, 42, 245, 248, 240, 19, 227, 215, 235, 218.29, 238, 5, 6, 123, 213; 380/280; 713/172; 711/144, 145, 22, 13; 710/1, 2, 3, 5, 7, 36, 46, 48, 129, 52; 370/432, 236

(56) References Cited

U.S. PATENT DOCUMENTS

| 4,044,338 A | 8/1977 | Wolf ............................ 365/49 |
| 4,453,212 A | 6/1984 | Gaither et al. ............... 711/221 |
| 4,782,441 A | 11/1988 | Inagami et al. ................. 712/9 |

(List continued on next page.)

FOREIGN PATENT DOCUMENTS

| EP | 0259095 | 3/1988 |
| EP | 0381471 | 8/1990 |
| EP | 0459232 | 12/1991 |
| GB | 2263985 | 8/1993 |
| GB | 2263987 | 8/1993 |
| GB | 2281422 | 3/1995 |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes on Intel P6," BYTE, Jan. 1996, 4 pages.
Isosure Bulletin entitled, "High Performance dual Architecture Processor," vol. 36, No. 03, Feb. 1993, pp. 231–234.
Minagawa et al., "Pre–Decoding Mechanism for Superscaler Architecture," May 9–10, 1991, IEEE Pacific Rim Conference on Communications, pp. 21–24.

Primary Examiner—Daniel H. Pan
(74) Attorney, Agent, or Firm—Conley, Rose & Tayon, PC; Lawrence J. Merkel

(57) ABSTRACT

A control bit vector storage is provided. The present control bit vector storage (preferably included within a functional unit) stores control bits indicative of a particular instruction. The control bits are divided into multiple control vectors, each vector indicative of one instruction operation. The control bits control dataflow elements within the functional unit to cause the instruction operation to be performed. Additionally, the present control bit vector storage allows complex instructions (or instructions which produce multiple results) to be divided into simpler operations. The hardware included within the functional unit may be reduced to that employed to perform the simpler operations. In one embodiment, the control bit vector storage comprises a plurality of vector storages. Each vector storage comprises a pair of individual vector storages and a shared vector storage. The shared vector storage stores control bits common to both control vectors.

28 Claims, 5 Drawing Sheets

U.S. PATENT DOCUMENTS

| | | | |
|---|---|---|---|
| 4,807,115 A | 2/1989 | Torng | 712/215 |
| 4,837,680 A | 6/1989 | Crockett et al. | 710/104 |
| 4,858,105 A | 8/1989 | Kuriyama et al. | 712/235 |
| 5,007,089 A * | 4/1991 | Matyas et al. | 380/280 |
| 5,136,696 A | 8/1992 | Beckwith et al. | 712/240 |
| 5,226,126 A | 7/1993 | McFarland et al. | 712/218 |
| 5,226,130 A | 7/1993 | Favor et al. | 712/238 |
| 5,355,457 A | 10/1994 | Shebanow et al. | 712/218 |
| 5,438,668 A | 8/1995 | Coon et al. | 712/204 |
| 5,490,280 A | 2/1996 | Gupta et al. | 712/23 |
| 5,511,172 A | 4/1996 | Kimura et al. | 712/235 |
| 5,560,025 A | 9/1996 | Gupta et al. | 712/23 |
| 5,598,546 A | 1/1997 | Blomgren | 712/209 |
| 5,623,619 A | 4/1997 | Witt | 711/3 |
| 5,822,560 A | 10/1998 | Pflum | 712/214 |
| 5,974,523 A * | 10/1999 | Glew et al. | 712/23 |
| 6,157,994 A | 12/2000 | Pflum | 712/23 |

* cited by examiner

CONTROL BIT VECTOR STORAGE FOR A MICROPROCESSOR

This application is a continuation of U.S. patent application Ser. No. 09/111,572, filed Jul. 8, 1998, now U.S. Pat. No. 6,157,994, which is a continuation of U.S. patent application Ser. No. 08/612,536, filed Mar. 8, 1996 now U.S. Pat. No. 5,790,821.

BACKGROUND OF THE INVENTION

1. Field of the Invention

This invention is related to the field of superscalar microprocessors and, more particularly, to the storing of control bit vectors representing instructions prior to the execution of these instructions.

2. Description of the Relevant Art

Superscalar microprocessors achieve high performance by executing multiple instructions during a clock cycle and by specifying the shortest possible clock cycle consistent with the design. As used herein, the term "clock cycle" refers to an interval of time accorded to various stages of an instruction processing pipeline. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively.

Many superscalar microprocessor manufacturers design microprocessors in accordance with the x86 microprocessor architecture. Due to its wide acceptance in the computer industry, the x86 microprocessor architecture is employed by a large body of software. Microprocessors designed in accordance with the x86 microprocessor architecture advantageously enjoy compatibility with this large body of software. Computer systems manufacturers may be more inclined to choose an x86-compatible microprocessor than a non-x86-compatible microprocessor for computer systems. Information regarding the x86 microprocessor architecture may be found in the publication entitled: "PC Magazine Programmer's Technical Reference: The Processor and the CoProcessor" by Hummel, Ziff-Davis Press, Emeryville, Calif. 1992. This publication is incorporated herein by reference in its entirety.

The x86 microprocessor architecture is characterized by a plurality of complex variable byte length instructions. A particular instruction may comprise a single byte, or multiple bytes. Additionally, instructions may specify one or more instruction operations. As used herein, an "instruction operation" refers to an operation which may be executed by a functional unit to produce a result. Exemplary instruction operations may include an arithmetic operation, a logical operation, an address generation, etc. Instructions may have explicit instruction operations (i.e. operations defined by the opcode of the instruction) and implicit operations defined by the particular instruction coded by the programmer (i.e. an address generation and a load or store operation for an operand stored in memory).

Unfortunately, complex instructions employing more than one instruction operation are often difficult to execute in superscalar microprocessors. Superscalar microprocessors typically employ multiple functional units to perform concurrent execution of instructions. Therefore, it is desirable that the functional units be relatively simple, such that each functional unit occupies a small amount of silicon area. For example, a functional unit may be configured to execute one instruction operation during a clock cycle. Complex instructions may utilize multiple clock cycles within such functional units. The complex instruction must be interpreted differently by the functional unit during each clock cycle to perform the instruction operations specified by that instruction. Complex logic may be employed to correctly execute these complex instructions, deleteriously enlarging the size of the functional unit. A less costly solution (in terms of complexity and silicon area) to the execution of complex instructions employing multiple instruction operations is desired.

The multiple functional units employed by a superscalar microprocessor may be equipped with reservation stations to store instructions and operands prior to their execution by the respective functional unit. Reservation stations are useful in a superscalar microprocessor because instructions may be decoded and dispatched prior to the source operands of the instruction being available. An "operand" or "operand value" of an instruction is a value the instruction is intended to operate upon. Operands may be located by an "operand address" which may define a register or a memory location storing the operand. Operands may be register operands in which the value is stored in a register, memory operands in which the value is stored in a memory location, or immediate operands in which the value is stored within the instruction itself. A source operand value is a value upon which the instruction operates, and a destination operand is a location to store the result of executing the instruction. A result is a value generated by operating upon the source operands according to the instruction operation(s) defined by the instruction.

Generally speaking, a reservation station comprises one or more storage locations (referred to as "reservation station entries"). Each reservation station entry may store a decoded instruction and operands or operand values. Other useful information may also be stored in a reservation station entry.

Typically, a decoded instruction is transferred to a storage device within a functional unit when the operand values have been provided. The decoded instruction is then decomposed into a plurality of control bits. The control bits are conveyed to the dataflow elements within the functional unit, and cause the dataflow elements to perform the instruction operation. A "dataflow element" is a device which performs a particular manipulation upon an input operand or operands according to a set of control bits conveyed thereto. For example, a multiplexor is a dataflow element which selects one of multiple input operands. The control bits provided to the multiplexor indicate which of the multiple input operands should be selected. As another example, an arithmetic unit is a dataflow element which may add or subtract input operands dependent upon the state of its input control bits.

Unfortunately, decomposing a decoded instruction into control bits and then performing the instruction operation defined by the instruction during a clock cycle may limit the frequency (i.e. the inverse of the clock cycle) of a superscalar microprocessor. It would be desirable to perform an equivalent function to the reservation station/functional unit pair wherein an instruction is selected from the reservation station during a clock cycle and the result is produced in a subsequent clock cycle without limiting the frequency of the superscalar microprocessor.

SUMMARY OF THE INVENTION

The problems outlined above are in large part solved by a control bit vector storage according to the present invention. The present control bit vector storage (preferably included within a functional unit) stores control bits indicative of a particular instruction. The control bits are divided into multiple control vectors, each vector indicative of one instruction operation. The control bits control dataflow elements within the functional unit to cause the instruction operation to be performed. Advantageously, logic for determining the control bits for the data flow of a functional unit is removed from the functional unit. The clock cycle time characterizing the functional unit may be advantageously reduced by the amount of time previously used by the logic to generate the control bits.

Additionally, the present control bit vector storage allows complex instructions (or instructions which produce multiple results) to be divided into simpler operations. The hardware included within the functional unit may be reduced to that employed to perform the simpler operations. Advantageously, the amount of silicon area occupied by the functional unit may be reduced. Superscalar microprocessors which employ multiple functional units may particularly benefit from this utility.

In one embodiment, the control bit vector storage comprises a plurality of vector storages. Each vector storage comprises a pair of individual vector storages and a shared vector storage. The shared vector storage stores control bits common to both control vectors. Advantageously, control bits which are the same for both control vectors are not redundantly stored in each of the individual vector storages.

Broadly speaking, the present invention contemplates a control bit vector storage for a microprocessor, comprising plurality of vector storage locations, a first selection device, and a control unit. Each of the plurality of vector storage locations is configured to store a plurality of control bits indicative of at least one instruction operation associated with an instruction. Coupled to the plurality of vector storage locations, the first selection device is configured to select the plurality of control bits stored in one of the plurality of vector storage locations. The first selection device is further configured to convey the plurality of control bits to a plurality of functional units configured to receive the plurality of control bits. Each of the plurality of control bits controls a particular portion of the plurality of functional blocks. Coupled to the selection device, the control unit is configured to control the selection device.

The present invention further contemplates a functional unit comprising a plurality of functional blocks, a plurality of storage locations, and a multiplexor. The plurality of functional blocks are configured to perform instruction operations. Each of the plurality of vector storage locations is configured to store a plurality of control bits indicative of at least one instruction operation. Coupled between the plurality of functional blocks and the plurality of vector storage locations, the multiplexor is configured to select an instruction operation from the plurality of vector storage locations for conveyance to the plurality of functional blocks.

BRIEF DESCRIPTION OF THE DRAWINGS

Other objects and advantages of the invention will become apparent upon reading the following detailed description and upon reference to the accompanying drawings in which.

Figure 1:
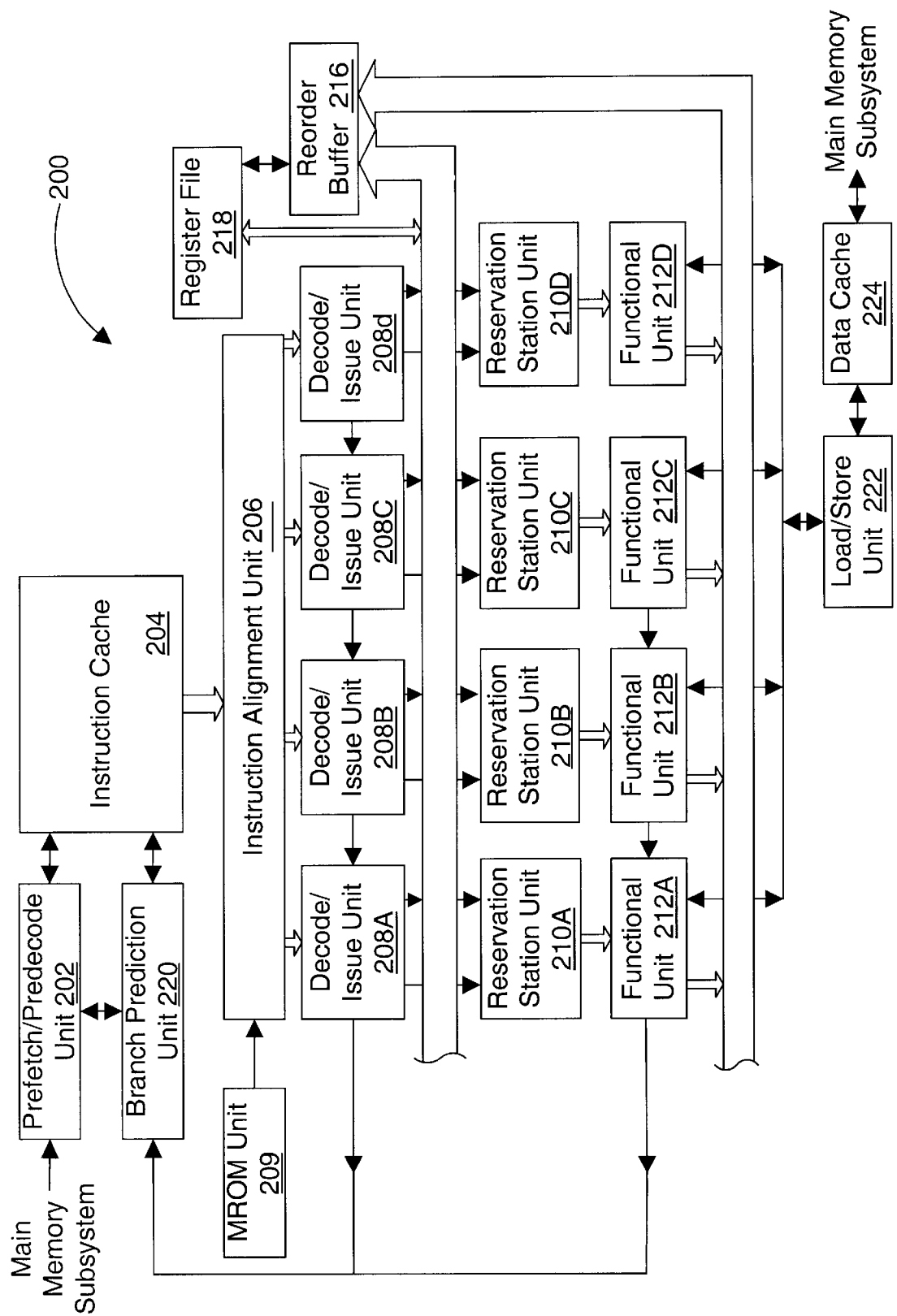
FIG. 1 is a block diagram of a superscalar microprocessor including decode units, reservation stations, and functional units.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a superscalar microprocessor 200 including a plurality of functional units 212 in accordance with the present invention is shown. As illustrated in the embodiment of FIG. 1, superscalar microprocessor 200 includes a prefetch/predecode unit 202 and a branch prediction unit 220 coupled to an instruction cache 204. Instruction alignment unit 206 is coupled between instruction cache 204 and a plurality of decode units 208A–208D (referred to collectively as decode units 208). Each decode unit 208A–208D is coupled to respective reservation station units 210A–210D (referred to collectively as reservation stations 210), and each reservation station 210A–210D is coupled to a respective functional unit 212A–212D (referred to collectively as functional units 212). Decode units 208, reservation stations 210, and functional units 212 are further coupled to a reorder buffer 216, a register file 218 and a load/store unit 222. A data cache 224 is finally shown coupled to load/store unit 222, and an MROM unit 209 is shown coupled to instruction alignment unit 206.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration.

Prefetch/predecode unit 202 is provided to prefetch instruction code from the main memory for storage within instruction cache 204. In one embodiment, prefetch/predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set. If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM or an SIB byte, or whether the byte contains displacement or immediate data.

TABLE 1.

Encoding of Start, End and Functional Bits

| Instr. Byte Number | Start Bit Value | End Bit Value | Functional Bit Value | Meaning |
|---|---|---|---|---|
| 1 | 1 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |
| 3–8 | 0 | X | 0 | Mod R/M or SIB byte |
| 3–8 | 0 | X | 1 | Displacement or immediate data; the second functional bit set in bytes 3–8 indicates immediate data |
| 1–8 | X | 0 | X | Not last byte of instruction |
| 1–8 | X | 1 | X | Last byte of instruction |

As stated previously, in one embodiment certain instructions within the x86 instruction set may be directly decoded by decode unit 208. These instructions are referred to as "fast path" instructions. The remaining instructions of the x86 instruction set are referred to as "MROM instructions". MROM instructions are executed by invoking MROM unit 209. More specifically, when an MROM instruction is encountered, MROM unit 209 parses and serializes the instruction into a subset of defined fast path instructions to effectuate a desired operation. A listing of exemplary x86 instructions categorized as fast path instructions as well as a description of the manner of handling both fast path and MROM instructions will be provided further below.

Instruction alignment unit 206 is provided to channel variable byte length instructions from instruction cache 204 to fixed issue positions formed by decode units 208A–208D. In one embodiment, instruction alignment unit 206 independently and in parallel selects instructions from three groups of instruction bytes provided by instruction cache 204 and arranges these bytes into three groups of preliminary issue positions. Each group of issue positions is associated with one of the three groups of instruction bytes. The preliminary issue positions are then merged together to form the final issue positions, each of which is coupled to one of decode units 208.

Before proceeding with a detailed description of the storage and execution of within reservation stations 210 and functional units 212, general aspects regarding other subsystems employed within the exemplary superscalar microprocessor 200 of FIG. 1 will be described. For the embodiment of FIG. 1, each of the decode units 208 includes decoding circuitry for decoding the predetermined fast path instructions referred to above. In addition, each decode unit 208A–208D routes displacement and immediate data to a corresponding reservation station unit 210A–210D. Output signals from the decode units 208 include decoded instructions for the functional units 212 as well as operand address information, immediate data and/or displacement data.

The superscalar microprocessor of FIG. 1 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible, as will be described further below. If a branch prediction is incorrect, the results of speculatively-executed instructions along the mispredicted path can be invalidated in the buffer before they are written to register file 218.

The decoded instructions and immediate data provided at the outputs of decode units 208A–208D are routed directly to respective reservation station units 210A–210D. In one embodiment, each reservation station unit 210A–210D is capable of holding instruction information (i.e. operand values, operand tags and/or immediate data) for up to three pending instructions awaiting issue to the corresponding functional unit. It is noted that for the embodiment of FIG. 1, each decode unit 208A–208D is associated with a dedicated reservation station unit 210A–210D, and that each reservation station unit 210A–210D is similarly associated with a dedicated functional unit 212A–212D. Accordingly, four dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on. It is further noted that for the embodiment of FIG. 1, decode unit 208A receives an instruction during a clock cycle which is prior, in the original instruction sequence, to instructions received by decode units 208B–208D during that clock cycle. Similarly, an instruction received by decode unit 208B is prior to the instructions received by decode units 208C–208D during that clock cycle, etc.

Reservation stations 210 further decompose the decoded instruction into control bits for execution by the respective functional unit 212. These control bits are then stored within the respective functional units 212. Because the x86 instruction set includes complex instructions characterized by multiple instruction operations, the control bits generated by a reservation station 210 may define multiple vectors. Each vector represents one of the multiple instruction operations defined by the instructions.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 216 is reserved for each instruction which, upon decode, is determined to modify the contents of one of the real registers. Therefore, at various points during execution of a particular program, reorder buffer 216 may have one or more locations which contain the speculatively executed contents of a given register. If following decode of a given instruction it is determined that reorder buffer 216 has a previous location or locations assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146, 382, filed Oct. 29, 1993 by Witt, et al., abandoned in favor of continuation application Ser. No. 08/501,243, filed Jul. 10, 2995, which is now U.S. Pat. No. 5,651,125. These documents are incorporated herein by reference in their entirety.

Reservation station units 210A–210D are provided to temporarily store instruction information to be speculatively executed by the corresponding functional units 212A–212D. As stated previously, each reservation station unit 210A–210D may store instruction information for up to three pending instructions according to one embodiment. Each of the four reservation stations 210A–210D contain locations to store the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212D, the result of that instruction is passed directly to any reservation station units 210A–210D that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210D has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210D where pending instructions may be waiting for the results of previous instruction executions to obtain the required operand values.

Generally speaking, load/store unit 222 provides an interface between functional units 212A–212D and data cache 224. In one embodiment, load/store unit 222 is configured with a load/store buffer with eight storage locations for data and address information for pending loads or stores. Decode units 208 arbitrate for access to the load/store unit 222. When the buffer is full, a decode unit must wait until the load/store unit 222 has room for the pending load or store request information. The load/store unit 222 also performs dependency checking for load instructions against pending store instructions to ensure that data coherency is maintained.

Data cache 224 is a high speed cache memory provided to temporarily store data being transferred between load/store unit 222 and the main memory subsystem. In one embodiment, data cache 224 has a capacity of storing up to sixteen kilobytes of data. It is understood that data cache 224 may be implemented in a variety of specific memory configurations, including a set associative configuration.

Figure 2:
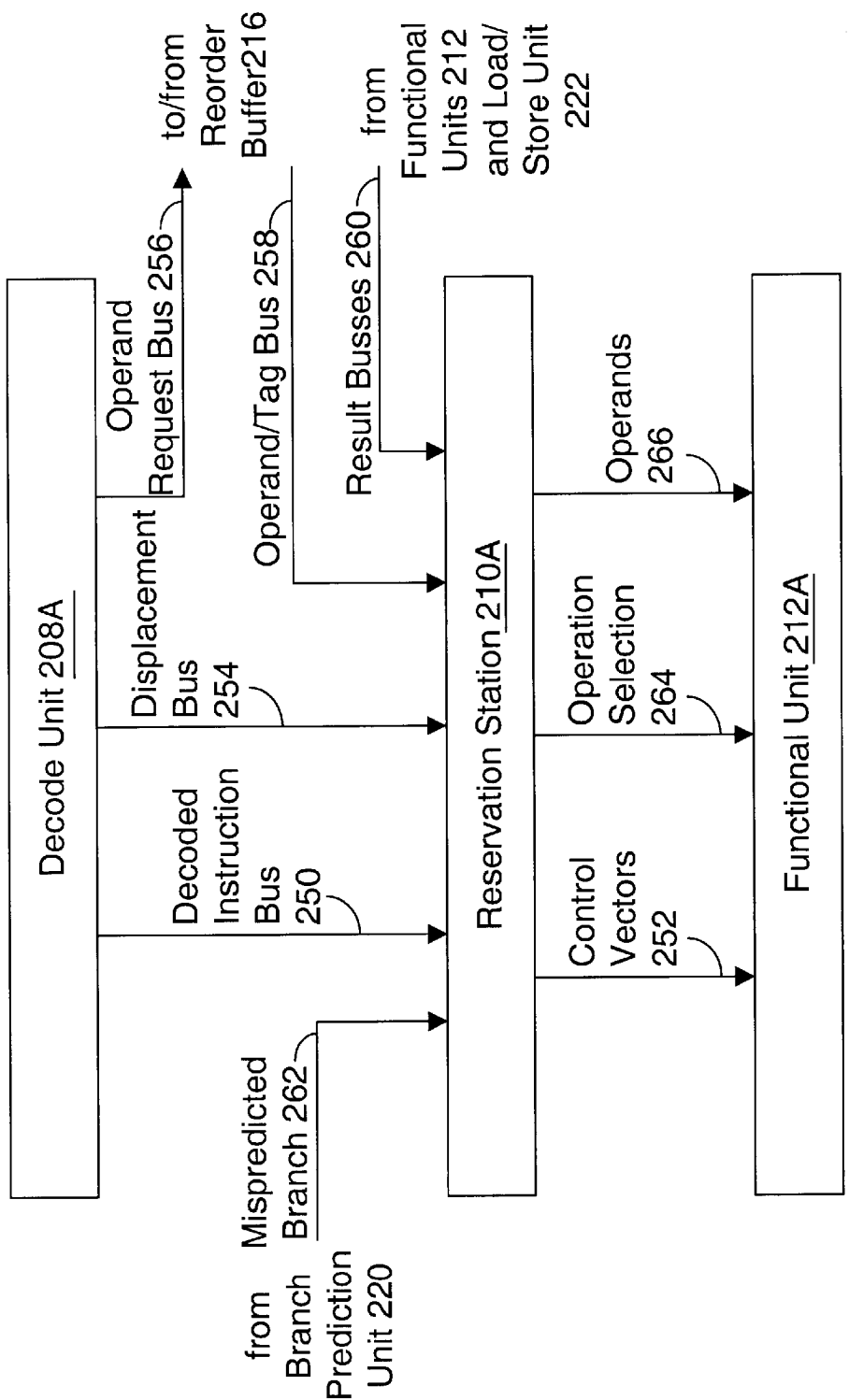
FIG. 2 is a block diagram of one of the decode units, reservation stations, and functional units shown in FIG. 1.

Turning now to FIG. 2, a block diagram of decode unit 208A, reservation station 210A, and functional unit 212A is shown. Interconnections between these units are shown according to one embodiment of the present invention. Interconnections between decode units 208B–208D, reservation stations 210B–210D, and functional units 212B–212D may be similar.

Decode unit 208A decodes an instruction and transfers the decoded instruction upon a decoded instruction bus 250 to reservation station 210A. Reservation station 210A decomposes the decoded instruction into a set of control vectors, and transfers these control vectors to functional unit 212A upon a control vectors bus 252. As used herein, a "control vector" or a "control bit vector" is a set of control bits defining the operation of functional unit 212A during a clock cycle in which the associated instruction is executed. The control bits are indicative of the operation of the dataflow elements within functional unit 212A to produce the intended instruction operation. An instruction may be decomposed into multiple control vectors to be executed by functional unit 212A. In one embodiment, up to two control vectors may be associated with a particular instruction.

Displacement data associated with an instruction is provided from decode unit 208A to reservation station 210A upon a displacement bus 254 coupled there between. Decode unit 208A requests operand values for source operands as well as provides the destination operand address for register operands upon an operand request bus 256. Additionally, immediate data may be conveyed upon operand request bus 256. Operand request bus 256 is coupled to reorder buffer 216, which returns the operand value, tag, or immediate data upon operand/tag bus 258 to reservation station 210A. Additionally, a plurality of result buses 260 are coupled to reservation station 210A. Result buses 260 convey results generated by functional units 212 and load/store unit 222 during a clock cycle, as well as an indication of the validity of each result conveyed. Additionally, a reorder buffer tag indicative of each result is conveyed upon result buses 260. The reorder buffer tag may be compared to operand tags stored within reservation station 210 to determine if the result is used by instructions stored therein. Furthermore, reorder buffer 216 uses the reorder buffer tag to store the result. It is noted that a result from load/store unit 222 may be the value transferred from data cache 224 in response to a load instruction.

A mispredicted branch bus 262 is coupled between reservation station 210A and branch prediction unit 220. When a mispredicted branch instruction is detected by branch prediction unit 220, a value indicative of the location within reorder buffer 216 storing the mispredicted branch instruction is conveyed upon mispredicted branch bus 262. Instructions subsequent to the mispredicted branch instruction are discarded by reservation station 210A. It is noted that, in other embodiments, mispredicted branch instructions may be signaled by reorder buffer 216 or by functional units 212.

In addition to control vectors bus 252, an operation selection bus 264 and an operands bus 266 are coupled between reservation station 210A and functional unit 212A. Operation selection bus 264 is configured to convey signals indicative of the instruction operation selected for execution during a clock cycle. In one embodiment, operation selection bus 264 conveys signals indicative of a particular control vector stored within functional unit 212A. The control vector causes the selected instruction operation to be performed by functional unit 212A. Operands bus 266 conveys the operand values associated with the instruction operation selected for execution during the clock cycle. The operand values may include register operand values, memory operand values (provided by load/store unit 222), and/or displacement and immediate data associated with the instruction.

Figure 3:
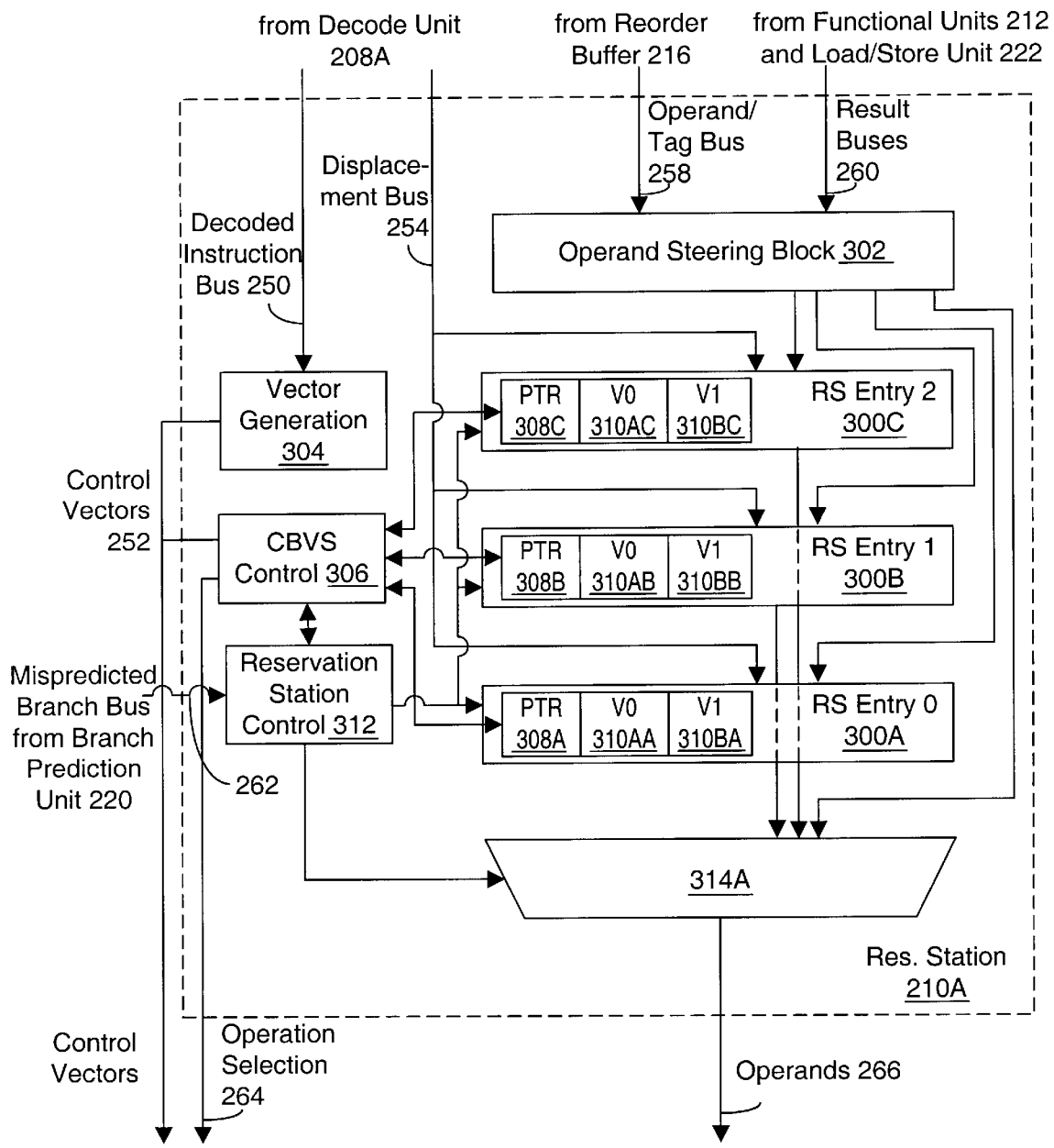
FIG. 3 is a block diagram of the reservation station shown in FIG. 2.

Turning now to FIG. 3, a diagram of one embodiment of reservation station 210A is shown. Reservation stations 210B–210D may be configured similarly. For simplicity of the discussion of FIG. 3, reference may be made to an instruction being stored in a reservation station entry. However, instruction information such as operands are stored in the reservation station entries. The instruction opcode is stored as one or more control vectors within functional unit 212A.

Generally speaking, reservation station 210A is configured to store instruction information regarding an instruction within one of reservation station entries 300A, 300B, and 300C (collectively referred to as reservation station entries 300). An operand steering block 302 and displacement bus 254 are coupled to reservation station entries 300. Operands may be received from operand steering block 302 and from displacement bus 254. Additionally, reservation station 210A includes a vector generation circuit 304. Vector generation circuit 304 receives the decoded instruction from decoded instruction bus 250 and produces corresponding control vectors upon a control vector bus 252. The control vectors are thereby conveyed to functional unit 212A for storage. Advantageously, decomposition of an instruction into control bits is performed prior to an instruction being selected for execution. The control bits are stored within functional unit 212A instead of within reservation station 210A.

A value is conveyed upon control vectors bus 252 along with the control vectors. The value is indicative of the validity of the conveyed control vectors, as well as which vector storage within functional unit 212A is selected to store the control vectors. Validity of the vectors and vector storage selection is performed by a control bit vector storage (CBVS) control unit 306, according to the vector storages allocated to reservation station entries 300. In one embodiment, the value comprises a plurality of write enable signals, one for each vector storage included in functional unit 212. Each write enable signal, when asserted, indicates that the corresponding vector storage is to store the control vectors conveyed. If none of the write enable signals are asserted, then the control vectors upon control vector bus 252 are invalid. CBVS control unit 306 is coupled to reservation station entries 300, and allocates a vector storage which is not allocated to a reservation station entry 300A–300C which is storing valid instruction information. Each reservation station entry 300 stores a pointer value indicative of the vector storage storing the control vectors corresponding to the instruction whose instruction information is stored by that reservation station entry. For example, reservation station entry 300A includes a pointer value storage location 308A. Similarly, reservation station entries 300B and 300C include pointer value storage locations 308B and 308C, respectively. In one embodiment, if more that one vector storage is not allocated to a reservation station entry 300, CBVS control unit 306 performs an ordered selection from among the unallocated vector storages. If a first vector storage is unallocated, it is allocated to store the newly generated control vectors. If the first vector storage is storing control vectors, then a second vector storage is allocated if not currently being used, etc.

Each reservation station entry 300 may include a plurality of vector valid indications. The vector valid indications are indicative of the validity of each control vector within the vector storage indicated by the respective pointer value. In one embodiment, each vector valid indication is a bit indicative, when set, that the associated vector is valid. In the embodiment shown in FIG. 3, up to two control vectors may be valid for an instruction. Two vector valid indications are therefore stored within each reservation station entry 300A–300C, shown as reference numbers 310AA and 310BA for reservation station entry 300A. Similarly, vector valid indications are shown as reference numbers 310AB, 310BB, 310AC, and 310BC for reservation stations 300B and 300C.

CBVS control unit 306 is further configured to select which instruction is executed by functional unit 212A. An instruction may be selected for execution if its operands have been provided or are being provided during a clock cycle. If multiple instructions are eligible for execution, then the instruction which is first in program order is executed. It is noted that the instruction stored in reservation station entry 300A is prior to the instructions stored in reservation station entries 300B and 300C in program order, according to one embodiment. Similarly, the instruction stored in reservation station entry 300B is prior to the instruction stored in reservation station entry 300C in program order. When an instruction is selected for execution by CBVS control unit 306, the corresponding vector storage and control vector within that vector storage are indicated via values upon operation selection bus 264. When the operation indicated by the selected control vector is completed by functional unit 212A, the associated vector valid indication is set to indicate that the control vector is invalid. When each of the vector valid indications within a reservation station entry 300 indicate invalid, then the instruction is complete. It is noted that the two control vectors are ordered. If the first control vector is valid (as indicated by vector valid indication 310AA, 310AB, or 310AC), it is executed. If the second control vector is valid (as indicated by vector valid indication 310BA, 310BB, or 310BC) and the first control vector is invalid, then the second control vector is executed. In one embodiment, the first control vector may be chosen for execution when the operands needed to execute the first control vector are available. Other operands (used by the second control vector) may not be available at the time the first control vector is executed. Certain instructions may provide an operand to the second control vector via execution of the first control vector. For example, instructions utilizing a memory operand may generate an address of the memory operand using the first control vector. The second vector then utilizes the value stored at the address as an operand.

A completed instruction is deleted from reservation station 210A by shifting down the instruction information stored within subsequent reservation station entries 300. For example, if the instruction stored within reservation station entry 300A is completed, then the instruction information in reservation station entries 300B and 300C are moved into reservation station entries 300A and 300B, respectively. It is noted that the vector storages within functional unit 212A may not be shifted. Instead, the pointer value stored within each reservation station entry 300A–300C is indicative of the vector storage storing the associated instruction.

If a mispredicted branch instruction is detected by branch prediction unit 220, then the value indicative of the reorder buffer location storing the branch instruction is received by a reservation station control unit 312 coupled to reservation station entries 300. Reservation station control unit 312 causes the vector valid indications to be set to invalid for each instruction stored within reservation station entries 300 which is subsequent to the mispredicted branch instruction. The instructions are thereby discarded from reservation station 210A. It is noted that the reorder buffer storage location storing each instruction may be stored within reservation station entries 300. Reservation station control unit 312 compares the stored reorder buffer indications to the mispredicted branch reorder buffer indications. Those instructions having reorder buffer indications which indicate that the instruction is subsequent to the mispredicted branch instruction in program order are discarded under the control of reservation station control unit 312. It is further noted that conditions other than a mispredicted branch may cause instructions to be discarded. For example, an instruction which accesses memory may create an exception. When an exception occurs, instruction execution begins within an exception handling routine. Such conditions may be handled similar to the mispredicted branch instruction (i.e. by discarding instructions subsequent to the instruction causing the condition).

In another embodiment, mispredicted branches and exceptions may be handled in a different manner. According to this embodiment, reorder buffer 216 communicates with load/store unit 222 upon detection of a mispredicted branch or exception. Concurrently, instruction fetching begins at the corrected address. Load/store unit 222 discards load and store memory accesses which are subsequent to the mispredicted branch or exception. Additionally, load memory accesses which are discarded forward false data to instructions within reservation stations 210 which are dependent upon the load memory accesses. In this manner, the instructions which are mispredicted execute and forward incorrect results to reorder buffer 216 (and to subsequent instructions within the mispredicted path, if applicable). After several clock cycles have elapsed, the mispredicted instructions will have cleared out of microprocessor 200 through the normal execution of instructions. Reorder buffer 216 discards the mispredicted instructions when results have been provided for those instructions. This embodiment of mispredicted branch and exception handling may be useful for microprocessors in which the branch misprediction penalty (i.e. the number of clock cycles from detection of a mispredicted branch instruction to the execution of instructions along the corrected path) is relatively long.

Operand steering block 302 is configured to select operands conveyed upon operand/tag bus 258 and result buses 260 for storage within reservation station entries 300. Operands and tags conveyed upon operand/tag bus 258 are stored into the reservation station entry 300A–300C allocated to the instruction associated with the operands. Operand tags from result bus 260 are used to determine if any of the results from result bus 260 are to be stored within reservation station entries 300. In one embodiment, instruction information (such as operands, operand tags, displacement data, etc.) is stored into reservation station entry 300C and shifted to the reservation station entry 300 which is intended to receive the instruction information under the control of reservation station control unit 312.

Reservation station 210A is configured to select an instruction for execution if one or more of its operands are being provided during a clock cycle. The operand or operands thus provided are conveyed to a selection device 314 along with operand values stored within reservation station entries 300. A selection device is a device configured to select at least one output value from a plurality of input values. The output value is selected according to select controls provided by a control unit coupled thereto. Selection device 314 selects the operand values associated with the instruction operation to be executed by functional unit 212A via select controls received from reservation station control unit 312. In one embodiment, selection device 314 comprises a plurality of multiplexors. One multiplexor is included for each operand. For example, in embodiments of reservation station 210A configured to store x86 instructions, a multiplexor is included for each of two register or memory operands and for a displacement value. If an immediate value is included in an instruction, that value is stored as one of the two operands. The selected operand values are conveyed upon operand bus 266 to functional unit 212A.

It is noted that vector generation circuit 304 may be included within decode unit 208A, in another embodiment. Such an embodiment would convey control vectors from decode unit 208A to functional unit 212A directly, while storing the operands and other instruction information within reservation station 210A.

Figure 4:
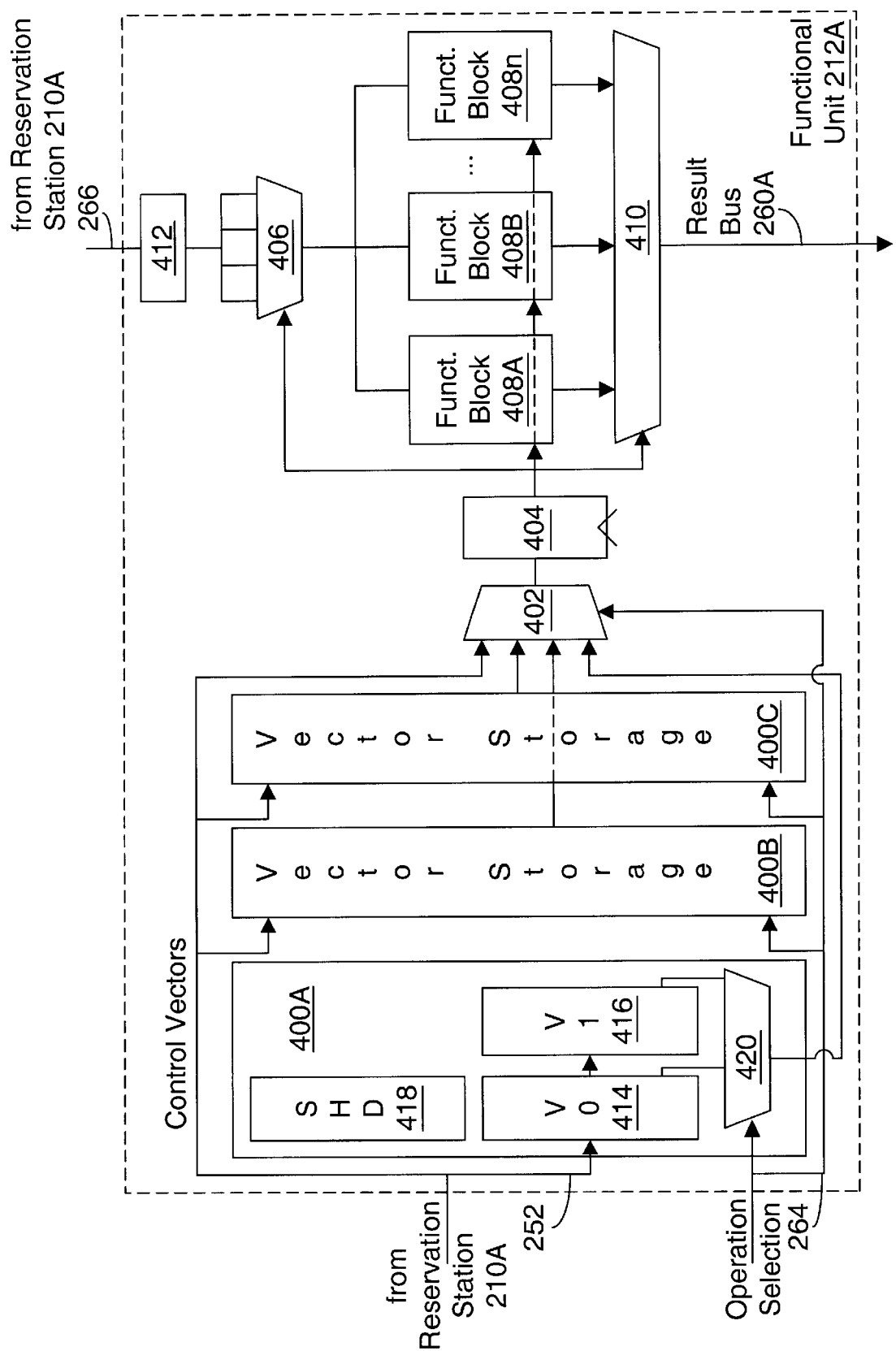
FIG. 4 is a block diagram of the functional unit shown in FIG. 2.

Turning now to FIG. 4, a diagram of one embodiment of functional unit 212A is shown. Functional units 212B–212D may be configured similarly. Functional unit 212A includes a plurality of vector storages 400A, 400B, and 400C (collectively referred to as vector storages 400). Vector storage 400A is shown in detail, and vector storages 400B and 400C may be configured similarly. Vector storages 400 form a control bit vector storage for the control bits representing instructions which are currently stored in reservation station 210A. Control vector bus 252 and operation selection bus 264 from reservation station 210A are coupled to each of vector storages 400. Additionally, control vector bus 252 is coupled as an input to a selection device 402 along with vector storages 400. Operation selection bus 264 is coupled to selection device 402 to provide select controls. A vector of control bits is selected by selection device 402 and conveyed through a storage device 404 to an operand selection device 406, a plurality of functional blocks 408A–408N (collectively referred to as functional blocks 408) and a result selection device 410. Operand selection device 406 selects from operands stored in a operand storage device 412, which stores operands received upon operand bus 266 from reservation station 210A. The operands selected by operand selection device 406 are conveyed to functional blocks 408, which compute a result by operating upon the operands. The results from each functional block 408A–408N are conveyed to result selection device 410, which selects a result for conveyance upon a result bus 260A. Result bus 260A is one of result buses 260 (shown in FIGS. 2 and 3).

Each vector storage 400A–400C is configured to store multiple control vectors corresponding to a particular instruction. In one embodiment, up to two control vectors are stored. Internal portions of such an embodiment are shown within vector storage 400A in FIG. 4. Vector storage 400A includes a first vector storage 414, a second vector storage 416, and a shared vector storage 418. Shared vector storage 418 stores control bits which are common to the control vectors (i.e. both control vectors include the set of control bits stored in shared vector storage 418). Advantageously, bits which are common to the vectors are stored only once within vector storage 400A. The shared bits are conveyed along with the first or second vector to selection device 402. First vector storage 414, second vector storage 416, and shared vector storage 418 comprise at least one register each, in one embodiment.

A vector selection multiplexor 420 is included in vector storage 400A. One of the signals upon operation selection bus 264 is a selection control for multiplexor 420. The selection control indicates whether the first or second vector is selected for execution. It is noted that the same selection control which is connected to multiplexor 420 may be connected to similar multiplexors within vector storage 400B and 400C. Selection controls for selection device 402 may then cause the selection of the appropriate control vector for execution.

Decomposing an instruction into multiple control vectors may advantageously allow simpler functional blocks to be included within functional unit 212A. As used herein, a "functional block" is a collection of one or more dataflow elements configured to perform a particular manipulation upon input operands. Exemplary functional blocks may be configured to perform an addition, a logical function (i.e. AND, OR, XOR, etc.), a bit shift, etc. Instead of including functionality for executing the entire operation in a single clock cycle, functionality may be included for performing each of the instruction operations specified by a particular instruction. Each instruction operation may then be executed during a different clock cycle. For example, instructions which include a memory operand specify an address generation instruction operation for generating the address of the memory operand (an implicit instruction operation) and an explicit instruction operation defined by the opcode of the instruction. A first control vector may be generated to perform the address generation, and then a second control vector to perform the explicit instruction operation. Additionally, logic for generating the vectors is no longer included in the instruction execution cycle. Cycle time used to perform an operation in the functional unit is advantageously reduced by the lack of control bit generation by the functional unit. The functional unit executes the vector according to the control bits, whether or not the vector is a portion of a more complex instruction or represents the instruction completely. Still further, functional unit 212A may execute other operations (from other control vectors) between the execution of the first and second control vector defining an instruction. If the first control vector is an address generation for a memory access, for example, multiple clock cycles may be necessary to perform the memory access. The second control vector may require the memory access value, and so functional unit 212A might otherwise be stalled during the memory access cycles.

The vectors generated for a particular instruction are dependent upon a "protocol" for that instruction. The instruction set is divided into one of several protocols, which indicate which control vectors are used, the instruction operation performed by each control vector, and the relationship between the control vectors. Table 2 (shown further below) lists an exemplary set of protocols for an embodiment having up to two control vectors per instruction.

As noted above, selection device 402 is configured to select a control vector for execution during a clock cycle. Selection device 402 is configured to select between the control vectors stored in vector storages 400, as well as from the control vectors conveyed upon control vector bus 252. In this manner, an instruction operation may be selected for execution during the same clock cycle it is stored into reservation station 210A and vector storages 400. Performance may be increased for cases in which reservation station 210A is empty when an instruction is dispatched and its operands are available. Operand selection bus 264 includes signals forming the select controls for selection device 402. In one embodiment, selection device 402 comprises at least one multiplexor.

Storage device 404 (comprising at least one register, in one embodiment) stores the control vector selected for execution. During a subsequent clock cycle, control bits are conveyed to operand selection device 406, functional blocks 408, and result selection device 410. Therefore, a control vector may include control bits which form selection controls for operand selection device 406, controls for dataflow elements within functional blocks 408, and selection controls for result selection device 410. Storage device 412 (which similarly comprises at least one register, in one embodiment), stores operands received upon operand bus 266 from reservation station 210A.

Operand selection device 406 selects operands from the operands provided by reservation station 210A. An instruction may operate upon a pair of operands, or an operand and a displacement or immediate value. Operand selection device 406 is configured to select operands such that the operands are conveyed to functional blocks 408 to perform the instruction operation specified by the control vector. In addition, operand selection device 406 may be configured to provide sign extension and zero extension of operands which contain fewer bits than functional blocks 408 are configured to operate upon. In one embodiment, functional blocks 408 are configured to operate upon 32 bit operands and operands may be 8, 16, or 32 bits. Still further, operand selection device 406 may be configured to select a field of an operand for use by a control vector. It is noted that certain x86 instructions access a byte other than the least significant byte of a register. Field selection allows this byte to be selected. In one embodiment, operand selection device 406 comprises a plurality of cascaded multiplexors configured to select operands, select fields from those operands, and perform sign or zero extension. It is noted that different operands may be conveyed to various functional blocks 408A–408N during the same clock cycle.

Result selection device 410 receives results computed by each of functional blocks 408 and selects a result for conveyance upon result bus 260A. As noted above, a reorder buffer tag and an indication that the result is valid are conveyed upon result bus 260A as well as the result generated. It is noted that separate valid indications may be transferred to reorder buffer 216 and reservation stations 210B–210D, reservation station 210A, and load/store unit 222. A first valid indication transferred to reorder buffer 216 and reservation stations 210B–210D indicate that the result generated is a final result for the instruction being executed. The result may be stored by reorder buffer 216 for later storage within register file 218. Additionally, the result may be collected by reservation stations 210B–210D if an operand tag stored therein matches the reorder buffer tag of the result. A second valid indication transferred to reservation station 210A may indicate valid during a clock cycle in which the first valid indication indicates invalid. An exemplary situation wherein the second valid indication indicates valid and the first valid indication indicates invalid is the generation of an intermediate result upon execution of a first control vector. The intermediate result may then be used as an operand of the second control vector. Finally, a third valid indication may be transferred to load/store unit 222 to indicate that an address generation has been performed by functional unit 212A. Load/store unit 222 receives and stores the address for access to data cache 224.

It is further noted that, in one embodiment, portions of a control vector may be stored in an encoded format within vector storages 400. In such an embodiment, combinatorial logic blocks would be inserted between vector storages 400 and storage device 404. A single logic block may be inserted between selection device 402 and storage device 404, or multiple logic blocks may be inserted between vector storages 400 and selection device 402.

Table 2 shows an exemplary set of control vector protocols for x86 fast path instructions:

TABLE 2

Exemplary Control Vector Protocols

| Protocol | First Vector | Second Vector |
|---|---|---|
| one operation | none | operation |
| load-op | address generation | operation |
| load-only | none | address generation |
| load-op-store | address generation | operation |
| op-store | address generation | operation |
| SRB | none | operand to L/S or address generation |
| FPU address gen. | address generation | address generation |
| Branch | none | operation |
| Load branch | address generation | operation |
| SIB | none | scaled addition |
| push | address generation | operation |
| pop | none | addition |
| divide | addition | subtraction |

The one operation protocol may be used for instructions having register operands and an instruction operation which may be performed by functional blocks 408 during a single clock cycle. The first control vector is not used, and the second control vector corresponds to the instruction operation. According to one embodiment of the present invention, each protocol which uses only one of the two control vectors uses the second control vector (i.e. the first control vector is unused). Instruction execution may begin with either the first control vector or the second control vector, dependent upon the protocol, but the instruction is always complete upon performance of the second control vector. Control logic may be simplified using this approach.

Instructions having memory operands utilize one of the load-op, load-only, load-op-store, or op-store protocols. If a memory operand is a source but not a destination, the load-op or load-only protocol may be used. If a memory operand is both a source and a destination, the load-op-store protocol is used. If a memory operand is a destination only, the op-store protocol is used. Generally speaking, each of these protocols includes a first vector which performs address generation (an implicit instruction operation), and a second vector which performs the explicit instruction operation defined by the opcode. The generated address is conveyed to load/store unit 222, which performs the loading or storing instruction operation. For protocols involving the load, the first vector is executed and the second vector is executed subsequent to receiving the load data. For protocols involving a store, the result is forwarded to load/store unit 222 for storage instead of to reorder buffer 216.

The SRB protocol is utilized by instructions which modify or access the special registers specified by the x86 microprocessor architecture. Microprocessor 200 stores a plurality of special registers in various locations, but most are concentrated in load/store unit 222. The special registers store information regarding processor state. For example, segment descriptors are stored in special registers. Additionally, debug features of microprocessor 200 are controlled by special registers, as well as the protected/unprotected mode of microprocessor 200, etc. Decode units 208 communicate directly with load/store unit 222 in order to transfer most information regarding special register loads and stores. A special register value may be read into or written from a register operand or a memory operand. For the register operand form, the SRB protocol passes the register value to load/store unit 222. For the memory operand, the SRB protocol specifies an address generation. The first control vector is not used for this protocol, and the second control vector causes the transfer of the register operand value to be stored into the special register to load/store unit 222. Alternatively, the second control vector may be used for the address generation.

The x86 microprocessor architecture defines floating point instructions. These instructions often operate upon operands stored upon a floating point stack containing eight entries. The floating point stack is reserved for use by the floating point instructions. A floating point unit executes the floating point operations, but the address for floating point load and store memory accesses is calculated by functional units 212 and load/store unit 222 performs the memory accesses. A floating point load/store operation may be a single precision value comprising 32 bits; a double precision value comprising 64 bits; or an extended precision value comprising 80 bits. Because integer values are at most 32 bits, microprocessor 200 executes floating point loads and stores in 32 bit portions (and a 16 bit portion for the extend precision operations). Therefore, a single precision access comprises one 32 bit portion; a double precision access comprises two 32 bit portions; and an extended precision access comprises two 32 bit accesses and one 16 bit access. Each load/store portion is executed in a separate functional unit 212. Therefore, generating an address for one of the portions includes generating the address defined by the floating point load or store, then adding an offset indicative of the portion being accessed. For the first 32 bit portion, an offset of zero is added. For the second 32 bit portion, an offset of four is added. For the 16-bit portion, an offset of eight is added. The FPU address generation protocol therefore includes two address generation steps. The first control vector calculates the address defined by the instruction. The second control vector adds the appropriate offset.

Branch instructions utilize the branch control vector protocol. Similar to the one operation protocol, no operation is generated for the first control vector, and the second control vector is the branch instruction operation. Similarly, a load-branch instruction protocol is defined for instructions for which the target of the branch is stored in memory. For example the RET instruction retrieves the target of the branch from the top of the stack. The first control vector causes an address generation for the load operation, and the second control vector performs the branch instruction operation.

Instructions which include the scale-index-base (SIB) byte are dispatched to two functional units. One of the functional units performs the addition of base register value and the scaled index register value, utilizing the SIB control vector protocol. The first vector is not used, and the second vector causes the scaled addition to be performed. It is noted that the index register value may be scaled by zero, two, four, or eight.

The PUSH instructions utilizes the push control vector protocol. The push control vector protocol specifies that the first control vector is an address generation to generate the ESP value for use by the push instruction. This address is conveyed to load/store unit 222. The second control vector is used to convey the value to be pushed to load/store unit 222.

The POP instruction is dispatched to a pair of functional units 212 as well, according to one embodiment of microprocessor 200. One of the functional units employs the pop control vector protocol. The first control vector is not used. The second control vector performs an addition to generate the ESP value subsequent to the execution of the pop instruction.

Integer divide instructions utilize the divide control vector protocol. Integer division is performed by functional units 212A through an iterative non-restoring division algorithm. The divisor is subtracted from high order bits of the dividend. If the result is positive, then a binary one is shifted into the quotient. If the result is negative, then a binary zero is shifted into the quotient and the divisor is added back to the dividend. The dividend is then shifted by one bit such that the next iteration will subtract the divisor from lower order bits of the dividend. The first control vector of the divide protocol is the addition portion, and the second control vector is the subtraction portion of the division method. The vector chosen upon a particular iteration is dependent upon the positive or negative result of the prior iteration. In one embodiment, a bit is stored in the vector storage 400A–400C storing the divide instruction. The bit is indicative of a positive or negative result of the previous iteration, and is used to control the selection of multiplexor 420 instead of the selection control provided upon operation selection bus 264.

More details regarding the dispatch of instructions to a pair of functional units may be found in the commonly assigned, co-pending patent application entitled: "An Apparatus and Method for Aligning Variable Byte-Length Instructions to a Plurality of Issue Positions", Ser. No. 08/582,473, filed Jan. 2, 1996 by Narayan, et al., which is now U.S. Pat. No. 5,822,559. The disclosure of this patent application is incorporated herein by reference in its entirety.

According to one particular exemplary embodiment, vector storages 400 store the information shown in Tables 3 and 4 below. Table 3 includes information stored in shared vector storage 418. Table 4 includes information stored in first and second vector storages 414 and 416.

TABLE 3

Exemplary Control Bits, Shared Storage

| | |
|---|---|
| BMSEL | mux select for build mask |
| BTSEL | mux select takes constant offset for shift amount else use B operand for shifter amount; used in BTx opcodes |
| COND_CODES [3:0] | condition codes for flag generation |
| DIV | divide step indicator |
| FLAG_CLR | pass the EFLAGS through; overwrite with IFLG; and clear bits according to mask |
| FLAG_SET | pass the EFLAGS through; overwrite with IFLG; and set bits according to mask |
| FLGSEL [2:0] | flag generation input select (2: B operand, 1: ALU, 0: SHIFT) |
| FUAHBYTE | indication from functional unit to load/store unit that load data needs to be placed on bits 15:8 instead of 7:0 |
| MOVF | control bit for taking B operand and overwriting with IFLG |
| MOVRF | control bit for taking B operand and transferring appropriate bits to result flag |
| OPSZ [1:0] | data operand size sent to load/store unit along with logical address |
| PRED_AD_TAKEN | prediction address taken; used in flag generation |
| REP | repeat signal to flag generation |
| REPE | repeat or equal signal to flag generation |
| REPNE | repeat or not equal signal to flag generation |
| SCALE [3:0] | one hot encoded SIB scale |
| SEGLDHI | indicates to load/store unit that high side of shadow descriptor register needs to be loaded |
| SEGLDLO | indicates to load/store unit that low side of shadow descriptor register needs to be loaded |
| SEGSEL [3:0] | indicates to load/store unit which segment offset to use |
| SFTCFIN | shifter carry flag in used for SAR, RCL_1, and RCR_1 opcodes |
| SHFLEFT | shift left for ROL, RCL_1, SHL |

TABLE 3-continued

Exemplary Control Bits, Shared Storage

| | |
|---|---|
| SHFRIGHT | shift right |
| SHFROT | shift rotate far ROL, ROR, RCL_1, and RCR_1 opcodes |
| USESIB | use a scale version of B operand |

TABLE 4

Exemplary Control Bits, Separate Storage Per Vector

| | |
|---|---|
| ADD_F | generate the add style flag equation |
| AOPSEL [3:0] | one hot select for A operand |
| BOPSEL [3:0] | one hot select for B operand |
| BRN | signal indicating unconditional branch |
| BRNCC | signal indicating Jcc |
| BTX_F | generate the bit test style flag equations |
| CIN | carry in bit |
| CMC_F | generate the complement carry style flag generations |
| FRESMUX [2:0] | encoded result bus mux select |
| GIN [2:0] | G (generate) bits for controlling ALU |
| LOG_F | use logical style flag generation |
| MOVCC | control bit for MOVCC opcode |
| MOVCC_EXC | control bit for MOVCC_EXC opcode; same as MOVCC but set exception on DSTAT if true |
| MOVCC_INT | control bit for MOVCC_INT opcode: same as MOVCC but sets sets software interrupt on DSTAT if true |
| MOVS_SEL | mux select for sending A operand to load/store unit |
| MUXCIN | mux select for using the carry flag or the operand steering supplied CIN for the ALU CIN |
| NEGATE | indication for ALU to negate the carry in bit |
| OPSIZE [2:0] | operand size (100: doubleword, 010: word, 001: byte) |
| PIN [3:0] | P (propagate) bits for controlling ALU |
| RSTATIN [2:0] | encoded status bus for load/store unit |
| SET_CC | SETcc opcode for flag generation; if condition codes and flags true, RES = 1; else = 0 |
| SIGNXA | sign extend A operand |
| SIGNXB | sign extend B operand |
| STAT [3:0] | control bit vector stored DSTAT |
| ZEROXA | zero extend the A operand |
| ZEROXB | zero extend the B operand |

It is noted that, although the above discussion occasionally focuses on the x86 microprocessor architecture, the present invention is not limited to use with this microprocessor architecture. Other microprocessor architectures which include instructions having complex instruction operations, or instructions which produce more than one result, may benefit from the present invention. The present invention may be particularly useful with complex operations which, through division into simpler operations, allow for less hardware (such as dataflow elements) to be included within functional units of the microprocessor. Furthermore, instructions which produce more than one result may add additional bussing between units to convey the additional results. By dividing the instruction into multiple instruction operations (each producing a single result), less bussing may be used between units.

Figure 5:
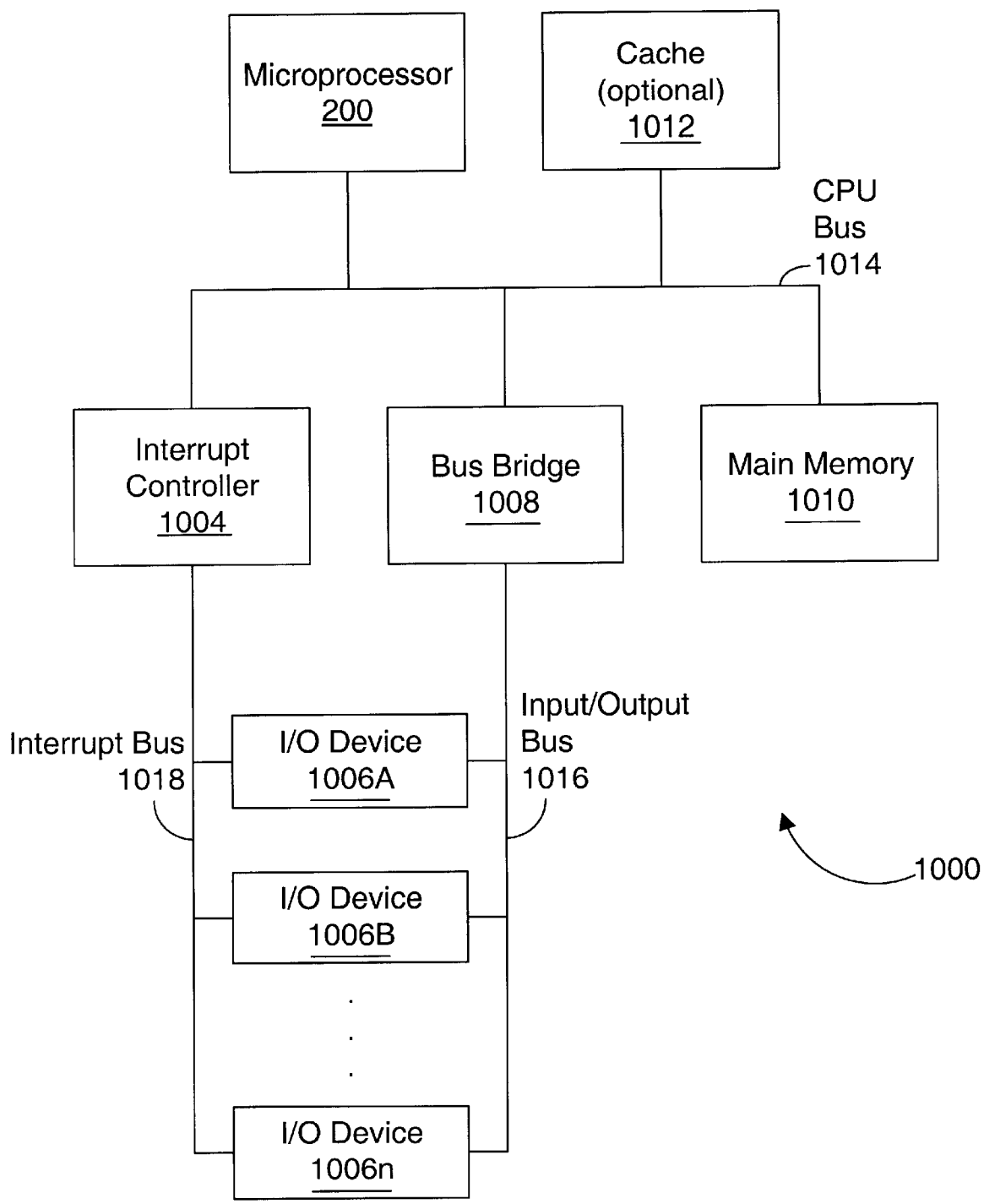
FIG. 5 is a block diagram of a computer 'system including the microprocessor shown in FIG. 1.

Turning now to FIG. 5, a computer system 1000 including microprocessor 200, an interrupt controller 1004, a plurality of input/output (I/O) devices 1006A–1006N (referred to collectively as I/O devices 1006), a bus bridge 1008, a main memory 1010, and a cache 1012 is shown. Microprocessor 200, interrupt controller 1004, bus bridge 1008, main memory 1010, and cache 1012 are coupled to a CPU bus 1014 which effects high speed, high bandwidth communication between the connected devices. Lower speed, lower bandwidth communication is provided for I/O devices 1006 via input/output bus 1016. I/O devices 1006 are coupled to interrupt controller 1004 via an interrupt bus 1018.

Interrupt bus 1018 may include at least one interrupt conductor per I/O device 1006A–1006N. An interrupt request signal conveyed on the associated interrupt conductor is indicative of a request for interrupt of microprocessor 200 by the associated I/O device 1006A–1006N. Interrupt controller 1004 is configured to receive the interrupt request signals and to convey an interrupt signal to microprocessor 200 upon CPU bus 1014 in response to the interrupt request signals. In one embodiment, interrupt controller 1004 is an 8259A interrupt controller used in IBM compatible personal computer systems. In another embodiment, interrupt controller 1004 includes multiple interrupt controllers similar to the 8259A cascaded to allow a larger number of I/O devices 1006 to be connected. Interrupt controller 1004 is programmable, and may be enabled to assert the interrupt signal individually for each interrupt request signal. In other words, interrupt controller may be enabled to assert the interrupt signal if the interrupt request signal from I/O device 1006A is asserted but not if the interrupt request signal from I/O device 1006B is asserted (or vice-versa). In another embodiment, interrupt controller 1004 may be programmed with a priority scheme for the interrupt request signals. The priority scheme is devised such that, if multiple interrupt request lines are asserted concurrently: the highest priority interrupt request is service first; followed by the next highest priority interrupt request; etc.

Bus bridge 1008 is provided to assist in communications (other than interrupt requests) between I/O devices 1006 and devices coupled to CPU bus 1014. I/O devices 1006 typically require longer bus clock cycles than microprocessor 200 and other devices coupled to CPU bus 1014. Therefore, bus bridge 1008 provides a buffer between CPU bus 1014 and input/output bus 1016. Additionally, bus bridge 1008 translates transactions from one bus protocol to another. In one embodiment, input/output bus 1016 is an Enhanced Industry Standard Architecture (EISA) bus and bus bridge 1008 translates from the CPU bus protocol to the EISA bus protocol. In another embodiment, input/output bus 1016 is a Peripheral Component Interconnect (PCI) bus and bus bridge 1008 translates from the CPU bus protocol to the PCI bus protocol. It is noted that many variations of CPU bus protocols exist. Microprocessor 200 may employ any suitable bus protocol.

I/O devices 1006 provide an interface between computer system 1000 and other devices external to the computer system. Exemplary I/O devices include a modem, a serial or parallel port, a sound card, etc. I/O devices 1006 may also be referred to as peripheral devices. Certain I/O devices 1006 may also be used to enhance the performance of computer system 1000 by performing certain tasks such that microprocessor 200 may perform other tasks. Exemplary devices include hardware accelerators. Additionally, mass storage devices such as hard disk drives may be included within I/O devices 1006. Main memory 1010 stores data and instructions for use by microprocessor 200. In one embodiment, main memory 1010 includes one or more dynamic random access memory (DRAM) cells and a DRAM memory controller. It is understood that main memory 1010 may be configured as multi-banked or inter-leaved memory. Cache 1012 is a small, high speed memory for temporarily storing data and instructions from main memory 1010. If microprocessor 200 requests an address from main memory 1010 and cache 1012 is storing data associated with the requested address, then cache 1012 provides the data. Cache 1012 is an optional component, and computer system 1000 is fully functional without it. However, cache 1012 may improve the performance of computer system 1000. It is noted that cache 1012 may also be inserted between microprocessor 200 and CPU bus 1014 in other embodiments. It is further noted that cache 1012 may employ a write-through or writeback protocol.

Although FIG. 5 shows a computer system 1000 including one microprocessor 200, computer system 1000 may include multiple microprocessors similar to microprocessor 200 coupled to CPU bus 1014. It is further noted that interrupt controller 1004, although shown in FIG. 5 to be connected to CPU bus 1014, may be coupled to I/O bus 1016 or yet another bus (not shown). When coupled in this manner, interrupt acknowledge bus transactions are conveyed through one or more bus bridges similar to bus bridge 1008 to interrupt controller 1004. Often, interrupt controller 1004 is coupled directly to an interrupt conductor upon microprocessor 200 for signalling interrupts in these embodiments.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al., now abandoned. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran., which is now U.S. Pat. No. 5,619,464. The disclosure of this patent application is incorporated herein by reference in its entirety.

It is additionally noted that other aspects regarding superscalar microprocessors may be found in the co-pending, commonly assigned patent application entitled "Superscalar Microprocessor Including a High Performance Instruction Alignment Unit", Ser. No. 08/377,843, filed Jan. 25, 1995 by Witt, et al., abandoned in favor of continuation application Ser. No. 08/884,818, filed Jun. 30, 1997, which is now U.S. Pat. No. 5,819,057. The disclosure of this patent application is incorporated herein by reference in its entirety.

In accordance with the above disclosure, a control bit vector store has been described which stores instructions within a functional unit as one or more control vectors. Each control vector comprises a plurality of control bits which control data flow elements within the functional unit, causing a particular instruction operation to be performed. By decomposing complex instructions into multiple control vectors, hardware used to perform the instructions within the functional unit may be simplified. Additionally, higher frequency operation of a microprocessor employing the control bit vector storage may be possible. Decoding that was previously performed within the functional unit is no longer performed. Instead, instruction execution may begin immediately.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a vector generation unit coupled to receive an instruction, wherein said vector generation unit is configured to generate up to N control vectors in response to said instruction, each of said N control vectors identifying an instruction operation corresponding to said instruction, N being an integer greater than 1, wherein an instruction operation is an operation executable by a functional unit to produce a result; and
   a vector storage coupled to said vector generation unit and configured to store said N control vectors.

2. The apparatus as recited in claim 1 further comprising one or more functional blocks, wherein each one of said N control vectors includes control bits which cause said functional blocks to perform said instruction operation specified by said one of said N control vectors.

3. The apparatus as recited in claim 1, further comprising a plurality of reservation station entries, wherein a first reservation station entry within said plurality of reservation station entries is allocated to said instruction.

4. The apparatus as recited in claim 3 further comprising a plurality of vector storages including said vector storage, and wherein said first reservation station entry is configured to store a pointer identifying said vector storage within said plurality of vector storages.

5. The apparatus as recited in claim 4 wherein said first reservation station entry is further configured to store a valid indication for each one of said N control vectors, said valid indication indicating a validity of said one of said N control vectors.

6. The apparatus as recited in claim 5 wherein said valid indication corresponding to said one of said N control vectors is set to indicate invalid upon selecting said one of said N control vectors for execution.

7. The apparatus as recited in claim 4 further comprising a control unit configured to select said first reservation station entry and one of said N control vectors for execution in response to one or more operands corresponding to said one of N control vectors becoming available.

8. The apparatus as recited in claim 7 wherein said control unit is configured to convey said pointer to said plurality of vector storages, and wherein said vector storage is selected from said plurality of vector storages responsive to said pointer, and wherein said control unit is configured to convey an indication of said one of N control vectors, and wherein said vector storage is configured to output said one of said N control vectors responsive to said indication.

9. The apparatus as recited in claim 7 wherein said control unit is configured to select said one of said N control vectors if one or more operands for said one of said N control vectors are available within said first reservation station entry.

10. The apparatus as recited in claim 9 wherein said control unit is configured to select said one of said N control vectors even if one or more operands for other ones of said N control vectors are not available within said first reservation station entry.

11. The apparatus as recited in claim 10 wherein said one of said N control vectors is defined to generate a result which is one of said operands of another one of said N control vectors.

12. The apparatus as recited in claim 1 wherein at least 2 of said N control vectors comprise a shared portion which is the same for each of said at least 2 of said N control vectors.

13. The apparatus as recited in claim 12 wherein said vector storage comprises a shared vector storage location, and wherein said shared portion is stored in said shared vector storage location.

14. The apparatus as recited in claim 1 wherein, if said instruction comprises a single instruction operation indicated by a single control vector, a first one of said N control vectors is invalid and a second one of said N control vectors is valid, and wherein said second one of said N control vectors is defined to be executed subsequent to said first one of said N control vectors.

15. A method comprising:

generating up to N control vectors corresponding to an instruction, each of said N control vectors identifying an instruction operation corresponding to said instruction, wherein N is an integer greater than 1, and wherein an instruction operation is an operation executable by a functional unit to produce a result; and selecting a first control vector of said control vectors for execution.

16. The method as recited in claim 15 further comprising selecting a second control vector of said control vectors for execution if said generating includes said second control vector.

17. The method as recited in claim 16 wherein said selecting said second control vector is subsequent to said selecting said first control vector.

18. The method as recited in claim 16 wherein said selecting said first control vector occurs during a first clock cycle and said selecting said second control vector occurs during a second clock cycle.

19. The method as recited in claim 18 wherein said selecting said first control vector is performed even if one or more operands corresponding to said second control vector are not available.

20. The method as recited in claim 19 wherein said first control vector is defined to generate a result which is one of said operands of said second control vector.

21. The method as recited in claim 16 wherein said selecting said first control vector is performed if one or more operands for said first control vector are available.

22. The method as recited in claim 16 wherein, if said instruction comprises a single instruction operation indicated by a single control vector, said first control vector is invalid and said second control vector is valid, and wherein said first control vector is defined to be executed prior to said second control vector.

23. The method as recited in claim 15 wherein said generating up to N control vectors comprises generating a shared portion which is shared by at least two of said N control vectors.

24. A computer system comprising:

a microprocessor including:

a reservation station coupled to receive an instruction, wherein said reservation station includes a vector generation unit configured to generate up to N control vectors in response to said instruction, each of said N control vectors identifying an instruction operation corresponding to said instruction, N being an integer greater than 1, wherein an instruction operation is an operation executable by a functional unit to produce a result; and a functional unit coupled to said reservation station, wherein said functional unit includes a vector storage configured to store said N control vectors, and an input/output (I/O) device coupled to said microprocessor, wherein said I/O device is configured to communicate between said computer system and a second computer system to which said I/O device is coupled.

25. The computer system as recited in claim 24 wherein said I/O device is a modem.

26. The computer system as recited in claim 24 wherein said I/O device is an audio I/O device.

27. The computer system as recited in claim 26 wherein said audio I/O device includes a sound card.

28. The computer system as recited in claim 24 further comprising a second microprocessor including:

a reservation station coupled to receive an instruction, wherein said reservation station includes a vector generation unit configured to generate up to N control vectors in response to said instruction, each of said N control vectors identifying an instruction operation corresponding to said instruction, N being an integer greater than 1; and a functional unit coupled to said reservation station, wherein said functional unit includes a vector storage configured to store said N control vectors.

* * * * *